Patented June 19, 1951

2,557,805

UNITED STATES PATENT OFFICE 2,557,805

DIALKYL VINYL PHOSPHATES AND POLYMERS

Robert W. Upson, Wilmington, Del., assignor to E. I. du Pont de Nemours & Company, Wilmington, Del., a corporation of Delaware No Drawing. Application January 18, 1949, Serial No. 71,546

4 Claims. (Cl. 260—80)

This invention relates to new organic compounds of phosphorus and more particularly to new esters of phosphorus acids and to their polymers.

A few unsaturated esters of certain phosphorus acids are known. None of these esters, however, has possessed the structure of the new esters which are described herein and which contain a vinyl group, i. e., $CH_2=CH-$, attached to an oxygen atom which is in turn attached to a phosphorus atom. The vinyl esters of this kind are valuable for a number of purposes to which the esters heretofore known are either inapplicable or less desirable.

This invention has as an object a new type of an unsaturated ester of an acid of phosphorus. A further object is the preparation of new and useful polymeric materials. Further objects reside in methods for obtaining these esters and their polymers. Other objects will appear hereinafter.

It has now been found that this new type of unsaturated esters of phosphorus acids can be prepared. The novel compounds of this invention are the vinyl esters of phosphorus acids in which there is only one phosphorus atom and that having a valence greater than three, their polymers and their copolymers. The esters of this invention can be prepared by the methods described below.

The monomeric vinyl esters of the above-defined phosphorus acids are prepared by the dehydrohalogenation of beta-haloethyl esters of the appropriate phosphorus acids, namely, the beta-haloethyl esters of phosphoric, phosphonic and phosphinic acids. The dehydrohalogenation is readily accomplished by heating the beta-haloethyl ester, e. g., diethyl beta-chloroethyl phosphate, in the presence of a basic dehydrohalogenating agent such as an alkali metal hydroxide or carbonate or an organic amine, preferably a tertiary amine. In some cases, especially in the preparation of the more readily polymerizable esters, the product consists principally of a polymer of the vinyl ester. The amount of dehydrohalogenating agent employed is at least stoichiometrically equivalent to the beta-haloethyl groups in the beta-haloethyl ester of the phosphorus acid being used, and preferably it is used in a small excess, e. g., 5–10% excess, over the theoretical amount. The beta-haloethyl ester and the dehydrohalogenating agent can be heated at temperatures ranging from 25° to 250° C. When an inert solvent is used, or a tertiary amine is employed as the dehydrohalogenating agent a convenient temperature is that at which the reaction mixture refluxes. This heating step is continued until the beta-haloethyl ester is substantially completely dehydrohalogenated, as evidenced by the cessation of the precipitation of the insoluble salt formed as a by-product. The reaction can be carried out in the absence of any added reaction medium, but, if desired, an inert solvent or diluent such as an ether or a hydrocarbon can be employed. When an alkali metal hydroxide is used as the dehydrohalogenating agent an alcohol such as ethanol can be used as solvent for the hydroxide.

The polymeric vinyl esters of phosphorus acids are prepared by heating the monomeric ester, either alone, or in the presence of another polymerizable compound having an ethylenic double bond. The polymerization is preferably carried out in the absence of oxygen, and, if desired a conventional vinyl polymerization initiator can be used to initiate the polymerization. The selection of the particular initiator and the particular polymerization temperature to be used depends on the particular phosphorus acid ester being polymerized. For example, the vinyl phosphonates alone polymerize at relatively low temperatures, e. g., 25°–100° C., in the absence of an initiator. On the other hand, the copolymerization of a vinyl ester of a phosphorus acid such as divinyl benzenephosphonate with another copolymerizable unsaturated compound such as methyl methacrylate can be carried out at a temperature of 70° to 85° C. in the presence of benzoyl peroxide or at a temperature of 60° to 80° C. in the presence of alpha, alpha'-azodiisobutyronitrile. The proportions of the different comonomers used in preparing the copolymers of this invention can be varied over wide limits, the exact proportions selected being dependent on the particular properties desired in the copolymer. Comonomer mixtures containing from 5–95% of the vinyl ester of the phosphorus acid and from 95–5% of the other copolymerizable compound containing an ethylenic double bond, or mixtures of two or more of such ethylenically unsaturated compounds, can be employed.

The beta-haloethyl esters of phophorus acids used as starting materials in preparing the vinyl esters of this invention can be prepared by conventional means, such as by the reaction of ethylene oxide with the appropriate phosphorus acid halide. This method is illustrated by the following description of the preparation of diethyl beta-chloroethyl phosphate: A reaction vessel fitted with a reflux condenser, mechanical stirrer, and inlet tube reaching to the bottom of the vessel is charged with 387 parts of diethyl chloro-phosphate and 3.9 parts of anhydrous aluminum chloride. Into the resulting solution there is introduced through the inlet tube 114 parts of ethylene oxide during a period of 8 hours at room temperature. Distillation of the resulting reaction mixtures gives 400 parts of diethyl beta-chloroethyl phosphate boiling at 115–117° C./5 mm.; $n_D^{25}$, 1.4281. Analysis: calculated for $C_6H_{14}O_4ClP$: P, 14.3%; Cl, 16.4%. Found: P, 14.5%; Cl, 16.5%.

The invention is further illustrated by the following examples in which proportions of reactants are expressed in parts by weight unless otherwise noted.

Example I

A solution containing 56.1 parts of potassium hydroxide dissolved in 789 parts of ethanol and 216 parts of diethyl beta-chloroethyl phosphate is heated at its boiling point in a reaction vessel fitted with a reflux condenser for 11 hours. The potassium chloride that separates from the reaction mixture during this period is removed by filtration and the filtrate is distilled. There is obtained 93 parts of diethyl vinyl phosphate boiling at 67° C./2.5 mm., and having a refractive index, $n_D^{25}$, of 1.4040. The product absorbs bromine from a solution of bromine in carbon tetrachloride. Analysis: calculated for $C_6H_{13}O_4P$: P, 17.2%; found: P, 16.8%.

Example II

A solution of 108.2 parts of diethyl beta-chloroethyl phosphate and 55.5 parts of triethylamine is heated to its boiling point in a reaction vessel fitted with a reflux condenser for 84 hours. On cooling to room temperature the reaction mixture separates into two layers, the top layer consisting of excess triethylamine, and the lower layer being a viscous liquid soluble in ethyl alcohol but insoluble in benzene. This viscous liquid layer is dissolved in ethyl alcohol, after which it is filtered to remove insoluble material, and the ethyl alcohol is then removed by distillation. The residue, amounting to 90 parts, is a brown viscous liquid consisting principally of a polymer of diethyl vinyl phosphate.

Example III

A solution containing 1.8 parts of monomeric diethyl vinyl phosphate, prepared as described in Example I, 1.04 parts of styrene and 0.14 part of benzoyl peroxide is heated in the absence of oxygen and at atmospheric pressure for 42 hours at 80° C. A colorless viscous liquid is formed from which 1.2 parts of a white solid polymer is obtained by precipitating the polymerization product in 39.6 parts of methanol. This diethyl vinyl phosphate/styrene copolymer softens at a temperature of 68° C. and contains 2.52% phosphorus.

The substitution of equivalent amounts of methyl methacrylate and acrylonitrile for the styrene in the process of the above example yields copolymers of diethyl vinyl phosphate with methyl methacrylate and acrylonitrile containing 1.42% phosphorus and 0.91% phosphorus, respectively.

Example IV

A mixture of 87.3 parts of di(beta-chloroethyl) benzenephosphonate (prepared by reaction of benzenephosphonyl dichloride with ethylene oxide) and 65.6 parts of anhydrous sodium carbonate is heated in a reaction vessel for 1.5 hours at 105° C., then for 2 hours at 155° C., and finally for 3 hours at 200° C. The resulting reaction mixture is distilled, and there is obtained 40 parts of monomeric divinyl benzenephosphonate, boiling at 174° C./3.0 mm., which solidifies at room temperature to a white crystalline compound. Analysis: calculated for $C_{10}H_{11}O_3P$: P, 14.8%; found: P, 14.9%. There is also obtained as a non-volatile residue from this distillation 15 parts of a viscous liquid polymer of divinyl benzenephosphonate.

Example V

To a solution of 56.6 parts of di-(beta-chloroethyl) benzenephosphonate (prepared by the action of benzenephosphonyl chloride with ethylene oxide) in 87.9 parts of benzene is added a solution of 22.4 parts of potassium hydroxide in 158.4 parts of ethanol over a period of 1 hour. The resulting solution is heated to its boiling point for 2 hours, and after cooling to room temperature the potassium chloride which precipitates as a by-product is removed by filtration. After removal of benzene and ethanol from the filtrate by distillation, there is obtained 18 parts of a nonvolatile residue consisting of polymeric divinyl benzenephosphonate. This polymer is a soft tacky solid which contains 15.1% phosphorus (calculated for $C_{10}H_{11}O_3P$: P, 14.8%).

In addition to the vinyl esters of the several types of phosphorus acids mentioned in the illustrative examples, the procedure described herein is applicable to the preparation of other esters of this kind among which the following compounds are further embodiments of my invention: vinyl phosphates such as trivinyl phosphate, monoalkyl divinyl phosphates, e. g., n-butyl divinyl phosphate, and other dialkyl monovinyl phosphates, e. g., dimethyl vinyl phosphates; vinyl esters of alkyl and aryl phosphonic acids, e. g., divinyl propanephosphonate and divinyl toluenephosphonate; vinyl esters of aryl and alkyl phosphinic acids, e. g., vinyl dimethylphosphinate and vinyl diphenylphosphinate. The particular vinyl phosphorus acid esters mentioned above can be prepared by the procedures described in the examples by substituting for the particular haloethyl phosphorus acid esters of the examples the following appropriate beta-haloethyl esters of phosphorus acids: tri(beta-bromoethyl) phosphate, n-butyl di-(beta-chloroethyl) phosphate, dimethyl beta-iodoethyl phosphate, di(beta-chloroethyl) n-propanephosphonate, di-(beta-chloroethyl) p-toluenephosphonate, beta-chloroethyl dimethylphosphinate, beta-chloroethyl diphenylphosphinate. The beta-haloethyl esters of the phosphorus acids mentioned above can be prepared by reaction of ethylene oxide with the corresponding phosphorus acid halides, i. e., phosphorus oxyhalides, the phosphonic acid halides and the phosphinic acid halides. The term halide as used herein and in the claims is used in the generic sense to include chlorides, bromides, and iodides, but not fluorides.

The dehydrohalogenating agents employed in producing the vinyl esters of this invention can be any organic or inorganic base which will react with some of the hydrogen halide as it is formed, but is otherwise inert to both the reactants and products under the conditions of the reaction. Specific examples of organic bases which can be used include amines such as pyridine, trimethylamine, triethylamine, dimethyl aniline, quinoline, N-methylpiperidine, and the like. Examples of inorganic bases which can be used include potassium hydroxide, lithium hydroxide, potassium carbonate, sodium carbonate, sodium bicarbonate, and the like.

As indicated previously the reaction takes place in the presence or absence of a solvent which is inert to both the reactants and products under the conditions of the reaction. Solvents which can be used, if desired, include ethers, e. g. dioxane; and aliphatic and aromatic hydrocarbons, e. g. petroleum ether and benzene.

In addition to the specific copolymers mentioned in the examples, the vinyl esters of phosphorus acids can be copolymerized with other copolymerizable organic compounds having an ethylenic double bond. Specific copolymerizable compounds which are suitable include monoolefins, e. g., ethylene, isobutylene and styrene; conjugated dienes, e. g. 1,3-butadiene; vinyl esters, e. g., vinyl acetate, vinyl chloride, and acrylonitrile; vinylidene compounds, e. g., vinylidene chloride; esters of alpha-methylene monocarboxylic acids, e. g., methyl methacrylate, methyl acrylate, and isobutyl methacrylate; and unsaturated anhydrides such as maleic anhydride. The copolymers can be prepared by conventional polymerization methods, e. g. by bulk, solvent, or emulsion polymerization methods.

The initiators which are useful in initiating the polymerization of the vinyl esters of this invention are those commonly used for initiating the polymerization of other vinyl compounds. In general initiators such as, for example, the following can be used to polymerize vinyl esters of phosphorus acids: peroxy compounds such as benzoyl peroxide, diethyl peroxide, tertiary-butyl hydroperoxide, diethyl diperphthalate, and ammonium persulfate; and azo compounds having an acyclic azo group, —N=N—, which is bonded from both nitrogens to different carbons, e. g., diethyl alpha,alpha'-azodiisobutyrate and alpha,alpha' - azodiisobutyramide (which can be prepared by the method of Thiele and Heuser, Ann., 290, 1–43 (1896) and 1,1'-azodicyclohexanecarbonitrile (which can be prepared by the method of Hartmann, Rec. trav. chim., 46 150–153 (1927)). These initiators can be used in a wide range of proportions, amounts ranging from 0.01% to 5% of the weight of the monomer being preferred.

In carrying out the polymerization of the esters of this invention in the presence of vinyl polymerization initiators a wide range of operating temperatures can be employed. The specific temperature employed in any particular case is dependent on the particular initiator being used. For example, when peroxy-type initiators are used temperatures ranging from 40° C. to 155° C. are suitable, when azo initiators are used temperatures of from 25° C. or lower, up to about 140° C. can be used.

The monomeric vinyl esters of phosphorus acids are particularly useful as chemical intermediates, as polymer intermediates, and as plasticizers for synthetic and natural polymeric materials.

The polymers, which include either the homopolymers or the copolymers obtained from a mixture of different vinyl esters of phosphorus acids or from a mixture containing one or more of these esters and another polymerizable compound containing an ethylenic double bond, are valuable in a number of industrial and commercial applications. The low molecular weight polymers are useful as flame-retarding plasticizers for natural and synthetic high molecular weight polymers. The high molecular weight polymers are also useful as ingredients in film-forming and coating compositions.

As many apparently widely different embodiments of this invention may be made without departing from the spirit and scope thereof, it is to be understood that this invention is not limited to the specific embodiments thereof except as defined in the appended claims.

I claim:

1. As a new compound, a dialkyl vinyl phosphate.
2. As a new compound, diethyl vinyl phosphate.
3. A composition of matter comprising the polymerization product of the compound defined in claim 1.
4. A composition of matter comprising the polymerization product of the compound defined in claim 2.

ROBERT W. UPSON.

REFERENCES CITED

The following references are of record in the file of this patent:

UNITED STATES PATENTS

| Number | Name | Date |
|---|---|---|
| 1,835,619 | Walsh | Dec. 8, 1931 |
| 2,155,591 | Garvey | Apr. 25, 1939 |
| 2,252,479 | Beyer | Aug. 12, 1941 |
| 2,394,829 | Whitehill et al. | Feb. 12, 1946 |
| 2,495,108 | Kosolapoff | Jan. 17, 1950 |

FOREIGN PATENTS

| Number | Country | Date |
|---|---|---|
| 534,826 | Great Britain | Mar. 19, 1941 |